(12) United States Patent
Jeong

(10) Patent No.: US 8,201,301 B2
(45) Date of Patent: Jun. 19, 2012

(54) WIPER HAVING TILTING MULTI-BLADE

(76) Inventor: Hyun Chan Jeong, Masan (KR)

( * ) Notice: Subject to any disclaimer, the term of this patent is extended or adjusted under 35 U.S.C. 154(b) by 154 days.

(21) Appl. No.: 12/690,208

(22) Filed: Jan. 20, 2010

(65) Prior Publication Data

US 2010/0218331 A1 Sep. 2, 2010

(30) Foreign Application Priority Data

Jan. 21, 2009 (KR) .......................... 10-2009-0004842

(51) Int. Cl.
*B60S 1/38* (2006.01)
*B60S 1/40* (2006.01)

(52) U.S. Cl. .............. 15/250.33; 15/250.41; 15/250.361; 15/250.44

(58) Field of Classification Search ................ 15/250.41, 15/250.361, 250.43, 250.44, 250.33, 250.451
See application file for complete search history.

(56) References Cited

U.S. PATENT DOCUMENTS

| | | | | | |
|---|---|---|---|---|---|
| 2,252,233 | A | * | 8/1941 | Sibley | 15/250.33 |
| 2,280,566 | A | * | 4/1942 | Zaiger | 15/250.33 |
| 2,537,411 | A | * | 1/1951 | Klingler | 15/250.23 |
| 4,063,328 | A | * | 12/1977 | Arman | 15/250.43 |
| 6,588,048 | B2 | * | 7/2003 | Ohyama | 15/250.43 |
| 2002/0032945 | A1 | * | 3/2002 | Miyamoto | 15/250.41 |

* cited by examiner

*Primary Examiner* — Gary Graham
(74) *Attorney, Agent, or Firm* — Jordan and HamburgLI

(57) ABSTRACT

Disclosed herein is a wiper having a tilting multi-blade to wipe a windshield of a transportation means. The wiper includes a wiper arm, a reciprocating tilting device, a blade holder, a multi-blade and a blade compressing plate. The wiper arm has a tilting control stopper. The reciprocating tilting device has a tilting angle control hole into which the tilting control stopper is inserted such that the reciprocating tilting device is rotatable within a limited angular range. The blade holder is coupled to the reciprocating tilting device and has holder compressing plate springs. The blade holder has an elastic notch to provide uniform elastic repulsive force. The multi-blade includes a coupling part which is inserted into the blade holder, and multiple blade lips which are symmetrically provided on left and right sides. The blade compressing plate is inserted into the blade holder and has plate springs to evenly compress the multi-blade.

4 Claims, 9 Drawing Sheets

[FIG. 1]
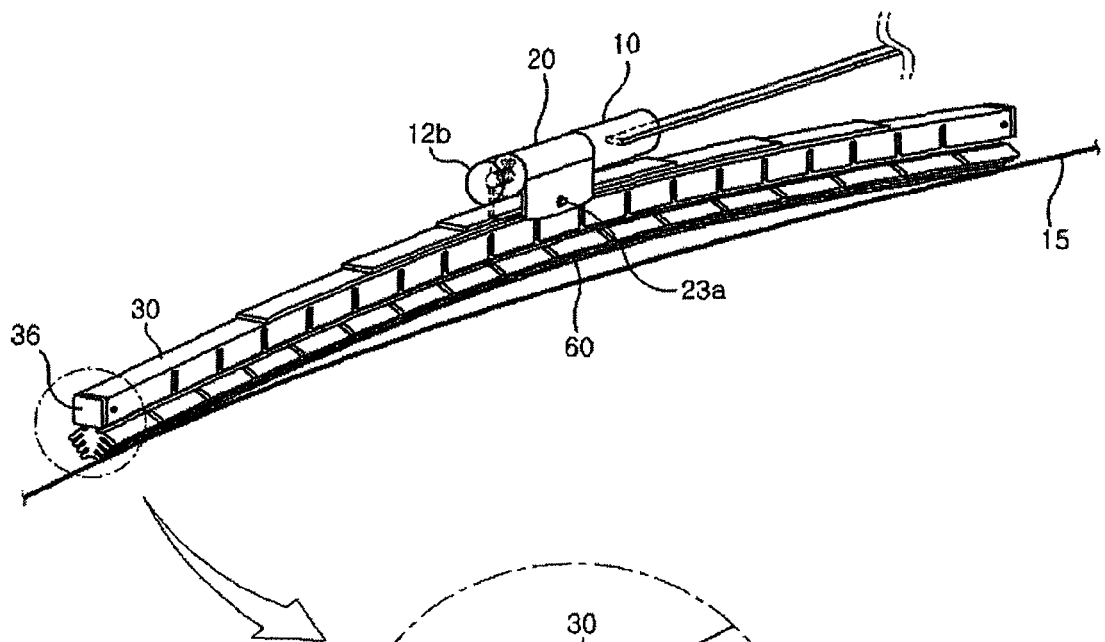
[FIG. 1A]
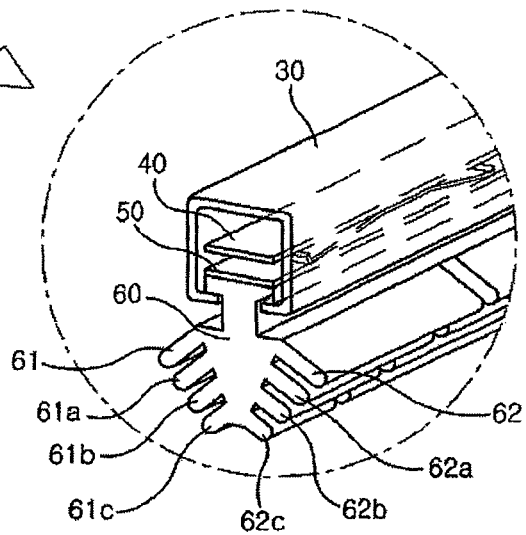

[FIG. 2]
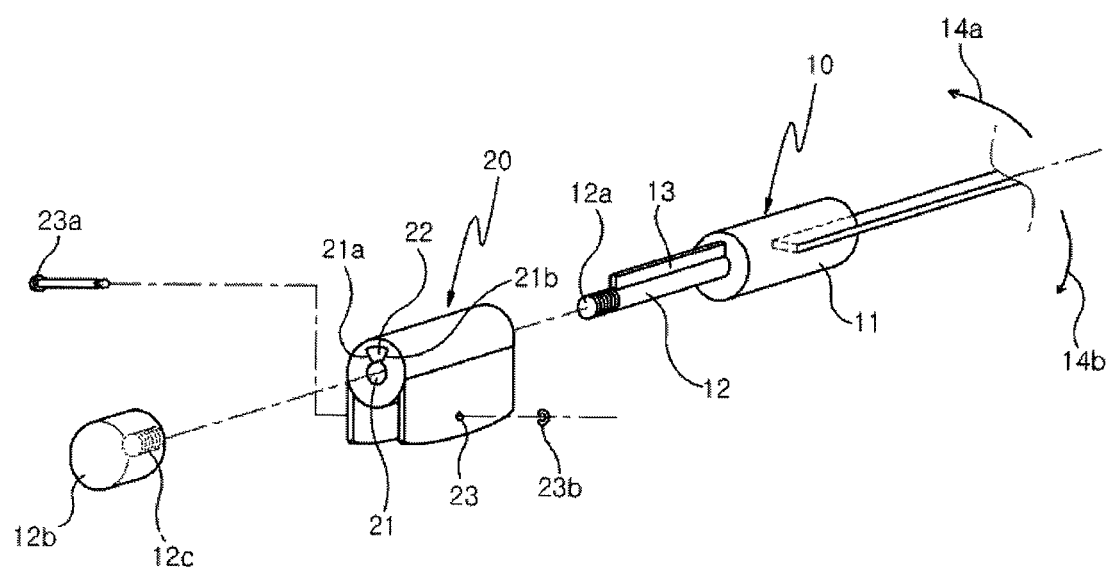

[FIG. 3]
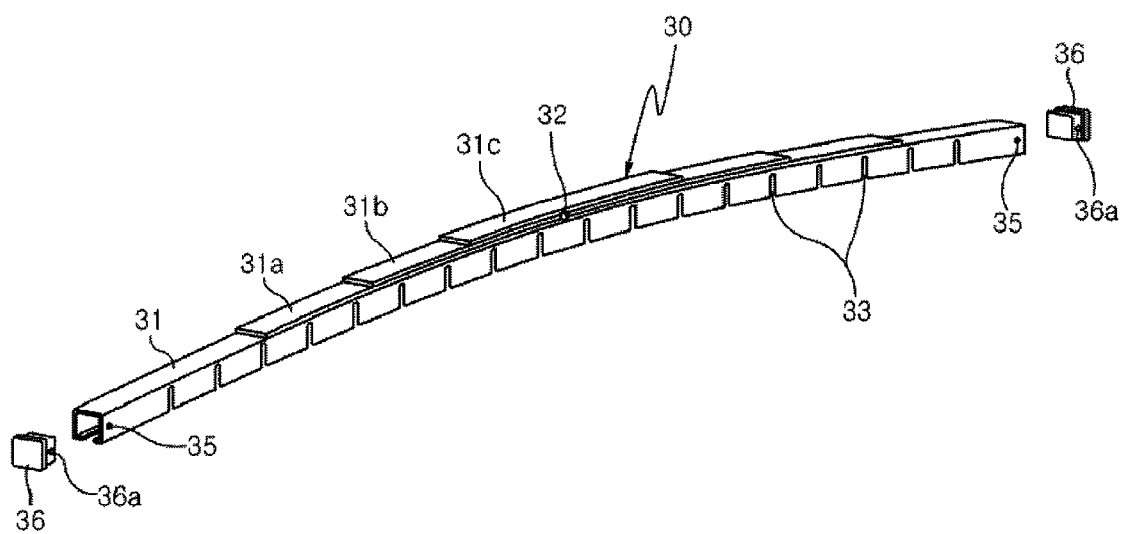

[FIG. 4]
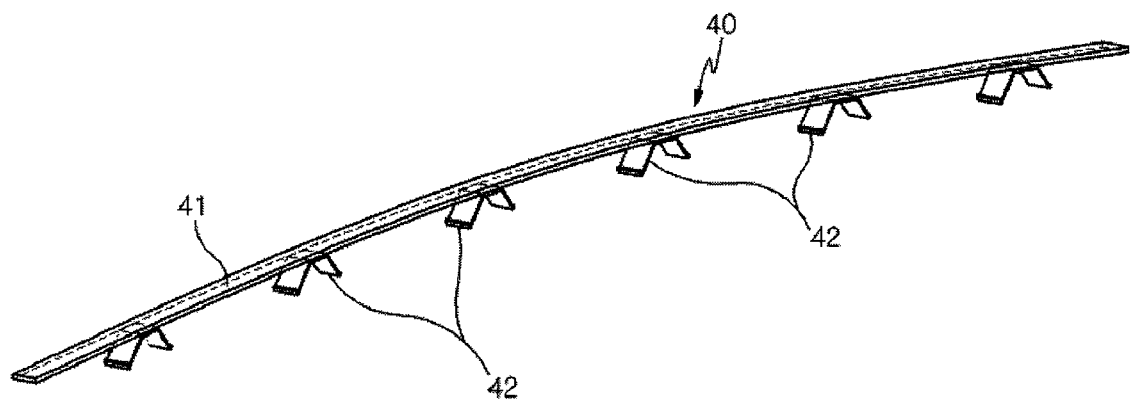

[FIG. 5]
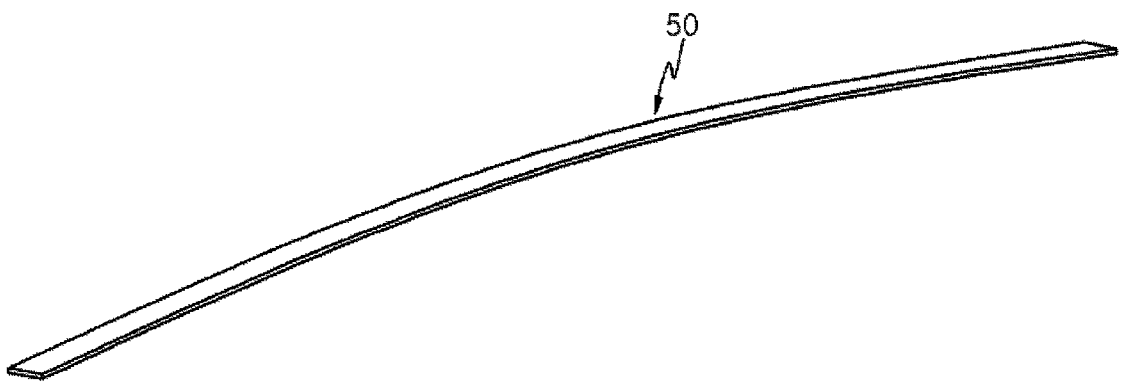

[FIG. 6]
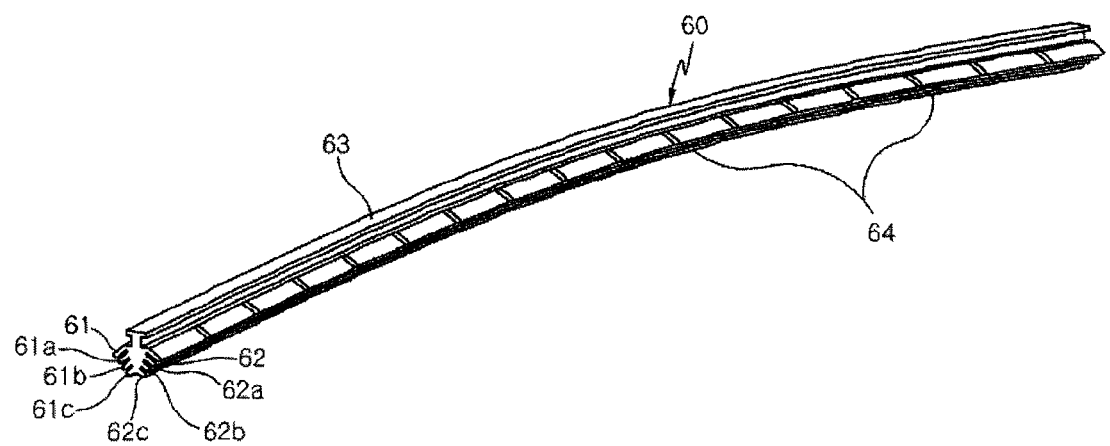

[FIG. 7]
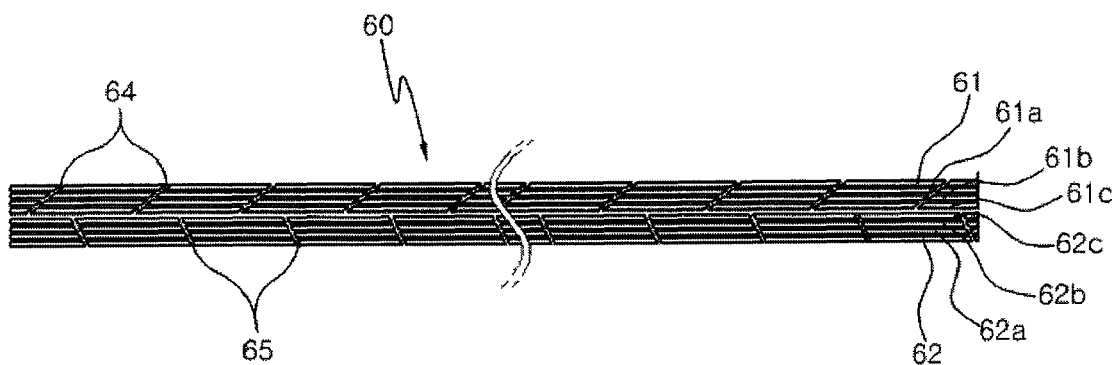

[FIG. 8]
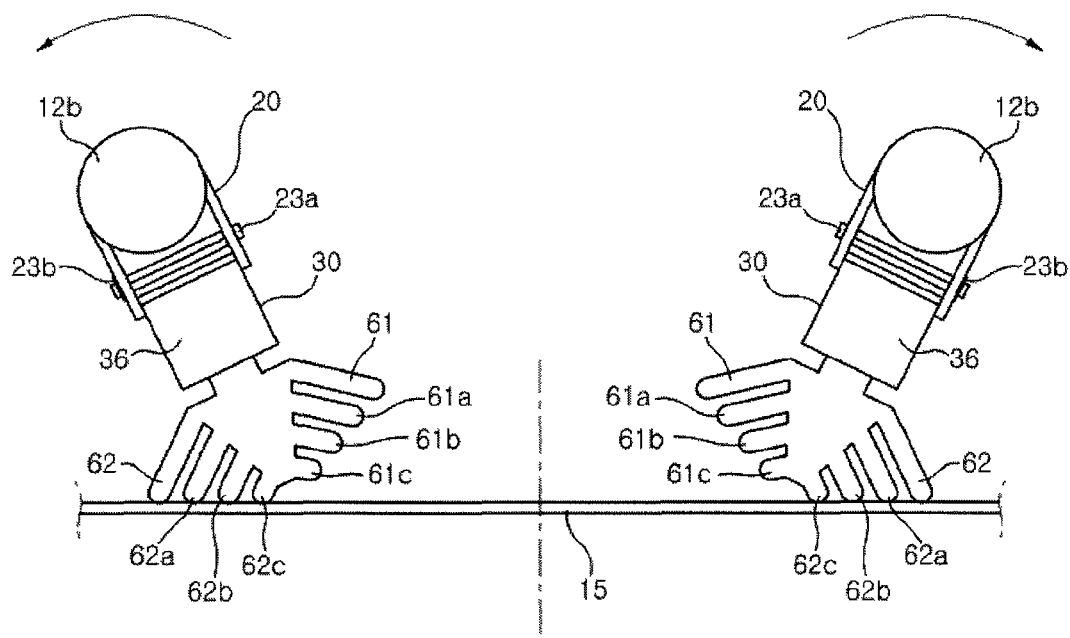

[FIG. 9]
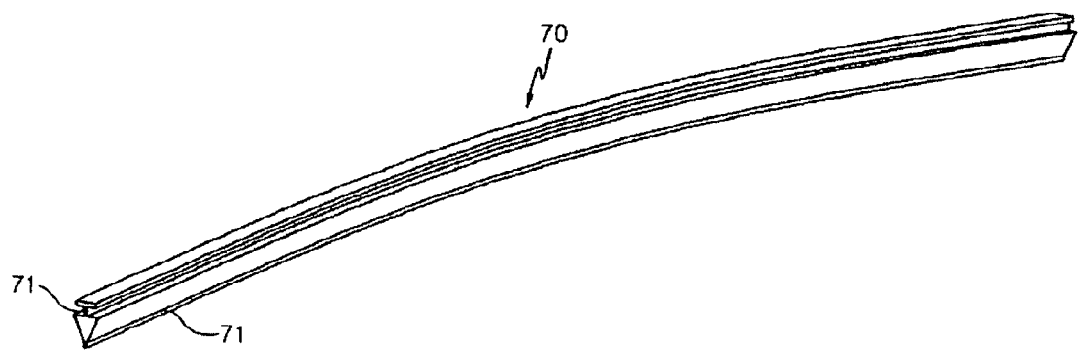
PRIOR ART

WIPER HAVING TILTING MULTI-BLADE

BACKGROUND OF THE INVENTION

1. Field of the Invention

The present invention relates generally to wipers for removing dirt or rain from windshields and, more particularly, to a wiper having a tilting multi-blade in which a blade holder is sectioned into several parts and provided with a blade compressing unit, so that compression force can be evenly applied to the entire length of a multi-blade such that the multi-blade evenly comes into close contact with a windshield, and in which a reciprocating tilting device conducts a blade tilting operation so that the blade tilting operation can be reliably conducted mechanically, and the blade integrally includes a plurality of blade lips to have a multiple structure, thus ensuring the superior durability of the blade.

2. Description of the Related Art

To date, wipers for vehicles, airplanes and other machines have been developed by various techniques including the following.

First, as shown in FIG. 9 illustrating a conventional wiper 70, to realize the reciprocating tilting operation, the wiper 70 includes a reciprocating tilting bridge 71 which enables tilting motion of a blade 72 using pressure applied to a wiper arm and friction between the blade 72 and a windshield. However, to achieve the above purpose, there is a limitation in that the reciprocating tilting bridge 71 must be relatively thin, typically, the thickness thereof must be about 1 mm or less. Therefore, the blade 72 is easily damaged or twisted. Furthermore, a degradation phenomenon attributable to changes in weather, solar light, use over a long time, etc. occurs. Hereby, a contact area between the blade 72 and the windshield becomes reduced, and the washing ability of the wiper 70 is rapidly deteriorated, thus imposing frequent replacement of the wiper on a user.

Second, in the case of a blade having a single blade lip, because a contact area between the blade and a windshield is relatively small, there is a limitation in the ability to remove impurities, such as dirt or rain. To overcome the problem of the blade having the single blade lip, a double wiper blade was developed. A technique similar to the double wiper blade was proposed in Korean Utility Model Laid-open Publication No. 20-1998-0035228 which was entitled 'Double wiper blade'. The technique of the double wiper blade has the effect of mitigating a loss of labor efforts and economic loss attributable to frequent replacement of the blade. However, in the same manner as the prior technique pertaining to the blade having the single blade lip, the blade tilting operation is realized by a tilting bridge of the blade, and the blade is formed into a single body in the longitudinal direction. Therefore, uniform compression force cannot be applied over the entire length of the blade. Thereby, there is a limitation in the washing ability, and the problems of a loss of labor efforts and economic loss still remains.

SUMMARY OF THE INVENTION

Accordingly, the present invention has been made keeping in mind the above problems occurring in the prior art, and an object of the present invention is to provide a wiper having a tilting multi-blade in which reciprocating blade tilting operation is conducted by a wiper arm unlike the conventional technique in which the blade tilting operation is conducted by a tilting bridge of the blade, and a blade holder is sectioned into several parts, and the blade has a multiple structure, so that compression force, washing ability and water drainage ability can be enhanced, and even though it is used for a long period, a wave phenomenon does not occur.

Another object of the present invention is to provide a wiper in which the multi-blade includes independent blade lips so that a contact area between the multi-blade and a windshield is increased, thus enhancing the washing ability of the wiper, and minimizing breakage, degradation, and torsion of the blade, thereby extending the lifetime of the wiper.

In order to accomplish the above object, the present invention provides a wiper having a tilting multi-blade to wipe a surface of a windshield of transportation means moving on the ground, the sea or in the air, the wiper including: a wiper arm having a tilting control stopper; a reciprocating tilting device having a tilting angle control hole into which the tilting control stopper of the wiper arm is inserted such that the reciprocating tilting device is rotatable within a limited angular range; a blade holder coupled to the reciprocating tilting device, with a plurality of holder compressing plate springs stacked in multilayers on top of one another on the blade holder, the holder compressing plate springs having different lengths, the blade holder having an elastic notch therein to provide uniform elastic repulsive force; a multi-blade comprising: a coupling part inserted into the blade holder; and multiple blade lips symmetrically provided on left and right sides; and a blade compressing plate inserted into the blade holder, the blade compressing plate having a plurality of plate springs to evenly compress the multi-blade.

The multi-blade may be made of rubber or silicone, and the blade lips of the multi-blade may comprise, in positional sequence from a top to a bottom, first blade lips, second blade lips, third blade lips, and fourth blade lips, wherein the first blade lips may extend longest cross-sectional lengths towards corresponding contact points with the windshield, and cross-sectional lengths of the blade lips may be reduced in a constant ratio from the first blade lips to the fourth blade lips such that when the multi-blade is tilted in one direction, ends of all the blade lips disposed on the corresponding side are brought into contact with the surface of the windshield.

The left water outlets and right water outlets may be alternately formed in the first through fourth blade lips in directions angled to a longitudinal direction of the multi-blade such that the left water outlets and the right water outlets are misaligned from each other, so that the first through fourth blade lips are sectioned into a plurality of parts by the left and right water outlets to consecutively eliminate a wave phenomenon induced by wiping, and impurities or washing water are discharged out of the multi-blade through the left and right water outlets.

Furthermore, the wiper may further include a friction prevention steel plate interposed between the multi-blade and the blade compressing plate, the friction prevention steel plate having a predetermined elastic repulsive force.

Preferably, a radius of curvature of the surface of the windshield may be 1.1 times to 2 times as long as a radius of curvature of the blade holder.

In a wiper having a tilting multi-blade according to the present invention, the multi-blade which is held by a blade holder has independent multiple blade lips, so that a contact area between the blade and a windshield is increased, thus enhancing the washing ability of the wiper, and minimizing breakage, degradation, and torsion of the blade, thereby extending the lifetime of the wiper.

Furthermore, unlike the conventional technique in which a blade has a single blade lip, the multi-blade may include quintuple or more blade lips as conditions required in a machine, such as a vehicle, to which the wiper is mounted. Therefore, the present invention can reliably eliminate dust, dirt or rain smeared on the windshield when traveling, thereby making the view of a user clear for the sake of safe driving. In addition, even though the wiper is used for a long period of time, a wave phenomenon does not occur, thus preventing an accident attributable to obstruction of the view of the user when driving. Moreover, the durability of the wiper is enhanced, a loss of labor efforts, and economic loss attributable to frequent replacement of the blade can be markedly reduced.

BRIEF DESCRIPTION OF THE DRAWINGS

The above and other objects, features and advantages of the present invention will be more clearly understood from the following detailed description taken in conjunction with the accompanying drawings, in which:

FIG. 1 is a perspective view, and FIG. 1A is an enlarged detail thereof, of a wiper having a tilting multi-blade, according to an embodiment of the present invention;

FIG. 2 is an exploded perspective view of a reciprocating tilting device which conducts a mechanical tilting operation according to the present invention;

FIG. 3 is a view illustrating a blade holder according to the present invention;

FIG. 4 is a perspective view of a blade compressing plate according to the present invention;

FIG. 5 is a perspective view of a friction prevention steel plate according to the present invention;

FIG. 6 is a perspective view of the multi-blade according to the present invention;

FIG. 7 is a bottom view of the multi-blade of FIG. 6;

FIG. 8 is a view showing the operation of the multi-blade of the present invention according to the direction of tilt; and FIG. 9 is a perspective view of a wiper having a tilting portion, according to a conventional technique.

DESCRIPTION OF THE PREFERRED EMBODIMENTS

Hereinafter, a preferred embodiment of the present invention will be described in detail with reference to the attached drawings.

FIG. 1 is a perspective view of a wiper having a tilting multi-blade 60, according to an embodiment of the present invention. FIG. 1A is an enlarged detail of FIG. 1 with an end cap 36 removed. FIG. 2 is an exploded perspective view of a reciprocating tilting device 20 which conducts a mechanical tilting operation according to the present invention. FIG. 3 is a view illustrating a blade holder 30 of the wiper according to the present invention. FIGS. 4, 5 and 6 respectively are perspective views of a blade compressing plate 40, a friction prevention steel plate 50, and the multi-blade 60 of the wiper. FIG. 7 is a bottom view of the multi-blade 60. FIG. 8 is a view showing the operation of the multi-blade 60 according to a tilting direction.

As shown in FIGS. 1 and 2, the wiper according to the embodiment of the present invention includes a wiper arm 10 which mechanically receives the drive force of a wiper motor (not shown). The wiper arm 10 includes an arm body 11, a connection shaft 12 which axially protrudes from the arm body 11, and a tilting control stopper 13 which is provided upright on the outer surface of the connection shaft 12. An external thread 12a is formed on the end of the connection shaft 12. The external thread 12a of the connection shaft 12 engages with an internal thread 12c formed in a fastening cap 12b.

The reciprocating tilting device 20 is assembled with the wiper arm 10. The reciprocating tilting device 20 changes the direction in which the multi-blade 60 is tilted, when a wiping direction of the wiper is converted between 14a and 14b. In detail, the reciprocating tilting device 20 has a shaft insert hole 21 into which the connection shaft 12 of the wiper arm 10 is inserted, and a tilting angle control hole 22 which communicates with the shaft insert hole 21. The tilting control stopper 13 is inserted into and guided by the tilting angle control hole 22 such that the reciprocating tilting device 20 performs angular motion within a limited angular range. In other words, inner sidewalls 21a and 21b are formed in the tilting angle control hole 22 on opposite sides of the longitudinal axis thereof, so that an angular range within which the tilting control stopper 13 is able to rotate is defined by the inner sidewalls 21a and 21b of the tilting angle control hole 22.

As shown in FIGS. 1 and 2, the blade holder 30 is connected to the reciprocating tilting device 20 by a connection pin 23a. The blade holder 30 is made of a metal plate, preferably, a high elastic metal plate, formed into a channel shape, to evenly disperse compression force applied to a windshield. Respective end caps 36 close each end of the channel.

In detail, as shown in FIG. 3, the blade holder 30 includes a blade holder body 31 and a plurality of holder compressing plate springs 31a, 31b and 31c. The holder compressing plate springs 31a, 31b and 31c have different lengths and are stacked on top of one another on the upper surface of the blade holder body 31 such that pressure is evenly applied to the multi-blade 60. Here, the holder compressing plate springs 31a, 31b and 31c are disposed at the medial portion of the blade holder 30 and are arranged such that the plate spring that is at the uppermost position is shortest and the lengths thereof are increased in a constant ratio from the top to the bottom.

Preferably, to bring the multi-blade 60 into close contact with the windshield, the blade holder 30 is configured such that a radius of curvature of the surface of the windshield may be 1.1 times to 2 times as long as that of the blade holder.

The blade holder body 31 of the blade holder 30 has a hollow bar shape which has a longitudinal square hole and is open on the lower surface thereof. Furthermore, elastic notches 33 are formed in each of both sidewalls of the blade holder body 31 at positions spaced apart from each other at regular intervals to provide elastic repulsive force to the blade holder body 31 such that it can be elastically compressed onto the surface of the windshield 15. In other words, because the blade holder body 31 has the elastic notches 33, pressure applied to the blade holder 30 can be evenly dispersed and, thereby, the wiper can be satisfactorily brought into close contact with the surface of the windshield 15.

As shown in FIG. 6, the multi-blade 60 is held by the blade holder 30. The multi-blade 60 has blade lips which are symmetrically arranged in the same number on left and right sides of the multi-blade 60. In detail, the multi-blade 60 is made of a material, such as rubber, silicone, etc. The blade lips comprise, in positional sequence from the top to the bottom, first blade lips 61 and 62, second blade lips 61a and 62a, third blade lips 61b and 62b, and fourth blade lips 61c and 62c. The first blade lips 61 and 62 extend the longest cross-sectional lengths towards corresponding contact points between them and the windshield, and the cross-sectional lengths of the blade lips are reduced in a constant ratio from the first blade lips 61 and 62 to the fourth blade lips 61c and 62c such that when the wiper is tilted in one direction, the ends of all the blade lips which are disposed on the corresponding side are brought into contact with the surface of the windshield 15, as shown in FIG. 8.

Furthermore, as shown in FIG. 7, left water outlets 64 and right water outlets 65 are alternately formed in the first through fourth blade lips 61 through 62c in directions angled to the longitudinal direction of the multi-blade 60 such that the left water outlets 64 and the right water outlets 65 are misaligned from each other. Thus, the first through fourth blade lips 61 through 62c are sectioned into several parts by the left and right water outlets 64 and 65, thereby consecutively eliminating a wave phenomenon induced by wiping. In addition, impurities or washing water are discharged out of the multi-blade 60 through the left water outlets 64 and the right water outlets 65.

As shown in FIG. 4, the blade compressing plate 40 is installed in the blade holder 30. The blade compressing plate 40 includes a plurality of plate springs 42 which are disposed at positions spaced apart from each other at regular intervals to evenly compress the multi-blade 60. In the embodiment, although each plate spring 42 is illustrated as having an approximately V shape, it is not limited to this shape.

Preferably, the friction prevention steel plate 50 of FIG. 5 is interposed between the multi-blade 60 and the blade compressing plate 40 to prevent friction between a coupling part 63 of the multi-blade 60 and the blade compressing plate 40.

In the wiper having the above-mentioned construction, the connection shaft 12 and the tilting control stopper 13 of the wiper arm 10 are respectively inserted through the shaft insert hole 21 and the tilting angle control hole 22. The fastening cap 12b is tightened over the end of the wiper arm 10.

Thereafter, the blade holder 30 is disposed such that a pin insert hole 23 formed in the reciprocating tilting device 20 is aligned with a pin insert hole 32 formed in the blade holder 30. Subsequently, the connection pin 23a is inserted through the pin insert holes 23 and 32 and a retainer ring 23b is fitted over the end of the connection pin 23a. Thereby, the blade holder 30 can be reliably coupled to the reciprocating tilting device 20.

Subsequently, the blade compressing plate 40 of FIG. 4, the friction prevention steel plate 50 of FIG. 5 and the multi-blade 60 of FIG. 6 are inserted in order into the longitudinal square hole of the blade holder 30. Blade removal prevention caps 36 are fitted into both ends of the blade holder 30 so that the elements disposed in the blade holder 30 are prevented from being removed therefrom even when the wiper reciprocates to the left and right.

In the wiper assembled through the above-mentioned process, the wiper arm 10 performs angular motion using drive force transmitted from the drive unit, that is, the wiper motor. At this time, the tilting operation of the multi-blade 60 is conducted by the reciprocating tilting device 20, as shown in FIG. 8.

In detail, depending on the direction in which the wiper arm 10 moves, the reciprocating tilting device 20 of FIG. 2 which is inserted over the connection shaft 12 and the tilting control stopper 13 changes the direction in which the multi-blade 60 is tilted, using friction between the windshield and the multi-blade 60. Here, the tilting control stopper 13 reciprocates within a range defined between the right inner sidewall 21a and the left inner sidewall 21b in the tilting angle control hole 22, thus limiting the angle at which the multi-blade 60 is tilted.

Furthermore, in consideration of the fact that compression force is reduced from the medial portion of the entire length of the blade holder 30 to which the wiper arm 10 is coupled, to both ends of the blade holder 30, the first, second and third holder compressing plate springs 31a, 31b and 31c are attached to the blade holder body 31. Therefore, the compression force is evenly applied to the medial portion and both ends of the blade holder 30. As a result, when wiping, the wiper can be mechanically balanced, and the close contact between the blade holder 30 and the windshield 15 can be maintained.

In addition, the blade compressing plate 40 is installed in the blade holder body 31 of the blade holder 30 and functions to compress the multi-blade 60. The blade compressing plate 40 comprises a blade compressing plate body 41 which is made of a metal plate having high elasticity, and the plate springs 42 which are provided on the blade compressing plate body 41 at positions spaced apart from each other at regular intervals, thus evenly and elastically compressing the multi-blade 60.

As well, the friction prevention steel plate 50 of FIG. 5 is interposed between the blade compressing plate 40 made of highly elastic metal and the multi-blade 60 made of soft material so as to prevent breakage or abrasion of the blade which would be induced by the difference in physical properties of the two materials.

Primarily, the multi-blade 60 is maintained in a state of close contact with the surface of the windshield 15. Every time the multi-blade 60 is tilted and changes the direction in which it is tilted, the blade lips 61, 61a, 61b and 61c or the blade lips 62, 62a, 62b and 62c come into close contact with the surface of the windshield 15 in a multiple contact structure, thus maintaining the optimal close contact state. Here, because the tilting operation of the blade holder 30 and the operation of changing the direction in which the blade holder 30 is tilted are smoothly conducted, the contact between the windshield 15 and the multi-blade 60 can be reliably ensured.

Furthermore, because the multi-blade 60 is made of rubber or silicone, even though the tilting operation of the wiper arm 10 is frequently repeated, damage, for example, torsion, of the blade can be prevented. In addition, a degradation phenomenon attributable to changes in weather, solar light, use over a long time, etc. can be overcome.

In the present invention, when the multi-blade 60 changes the direction in which it is tilted while wiping, the first, second, third and fourth left blade lips 61, 61a, 61b and 61c or the first, second, third and fourth right blade lips 62, 62a, 62b and 62c which are reduced in length in a constant ratio come into close contact with the surface of the windshield 15 in order.

Due to such operation of the multi-blade 60, the present invention can prevent a problem of impurities or washing water remaining on the windshield 15. As well, a wave phenomenon does not occur even if a large amount of water, for example, in a heavy rain, is applied onto the windshield 15, thus preventing distortion of vision.

In particular, the left water outlets 64 and the right water outlets 65 which are diagonally formed in the multi-blade 60 divide the entire length of the multi-blade 60 into several portions having appropriate lengths. Thus, a wave phenomenon which is induced in the first blade lip is eliminated by the second, third and fourth blade lips in order. Furthermore, impurities or washing water are discharged out of the wiper through the left and right water outlets 64 and 65. Thereby, the washing ability of the wiper can be further enhanced, thus making the view of a user clearer.

As described above, a wiper according to the present invention can reliably and smoothly conduct a mechanical, reciprocating, tilting operation. Therefore, a sufficient contact area between a blade and a windshield is ensured, thus ensuring superior washing ability of the wiper. Furthermore, the durability of the wiper can be increased, thus extending the lifetime. Furthermore, the blade has multiple blade lips and is sectioned into several portions, so that compression force applied to the entire blade is evenly dispersed, thus further increasing the contact area between the blade and the windshield, thereby markedly enhancing the washing ability of the wiper.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A wiper having a tilting multi-blade to wipe a surface of a windshield of transportation means moving on the ground, the sea or in the air, the wiper comprising:
    a wiper arm having a tilting control stopper;
    a reciprocating tilting device having a tilting angle control hole into which the tilting control stopper of the wiper arm is inserted such that the reciprocating tilting device is rotatable within a limited angular range;
    a blade holder coupled to the reciprocating tilting device, with a plurality of holder compressing plate springs stacked in multilayers on top of one another on the blade holder, the holder compressing plate springs having different lengths, the blade holder having an elastic notch therein to provide uniform elastic repulsive force;
    a multi-blade comprising: a coupling part inserted into the blade holder; and multiple blade lips symmetrically provided on left and right sides; and
    a blade compressing plate inserted into the blade holder, the blade compressing plate having a plurality of plate springs to evenly compress the multi-blade.

2. The wiper as set forth in claim 1, wherein the multi-blade is made of rubber or silicone, and the blade lips of the multi-blade comprises, in positional sequence from a top to a bottom, first blade lips, second blade lips, third blade lips, and fourth blade lips, wherein the first blade lips extend longest cross-sectional lengths towards corresponding contact points with the windshield, and cross-sectional lengths of the blade lips are reduced in a constant ratio from the first blade lips to the fourth blade lips such that when the multi-blade is tilted in one direction, ends of all the blade lips disposed on the corresponding side are brought into contact with the surface of the windshield.

3. The wiper as set forth in claim 2, wherein left water outlets and right water outlets are alternately formed in the first through fourth blade lips in directions angled to a longitudinal direction of the multi-blade such that the left water outlets and the right water outlets are misaligned from each other, so that the first through fourth blade lips are sectioned into a plurality of parts by the left and right water outlets to consecutively eliminate a wave phenomenon induced by wiping, and impurities or washing water are discharged out of the multi-blade through the left and right water outlets.

4. The wiper as set forth in claim 1, further comprising:
    a friction prevention steel plate interposed between the multi-blade and the blade compressing plate, the friction prevention steel plate having a predetermined elastic repulsive force.

* * * * *